United States Patent
de Silva et al.

(10) Patent No.: US 6,564,320 B1
(45) Date of Patent: May 13, 2003

(54) LOCAL HOSTING OF DIGITAL CERTIFICATE SERVICES

(75) Inventors: Mahinda K. de Silva, Sunnyvale, CA (US); Atul Tulshibagwale, Sunnyvale, CA (US); Xinhong Yuan, Sunnyvale, CA (US)

(73) Assignee: VeriSign, Inc., Mountain View, CA (US)

( * ) Notice: Subject to any disclaimer, the term of this patent is extended or adjusted under 35 U.S.C. 154(b) by 0 days.

(21) Appl. No.: 09/107,331

(22) Filed: Jun. 30, 1998

(51) Int. Cl.[7] ................................. H04L 9/00
(52) U.S. Cl. ................ 713/156; 713/175; 713/201; 707/9
(58) Field of Search ............... 713/155–158, 713/175, 200, 201; 707/9, 501, 505–508, 517, 530, 523, 524, 200; 705/44, 75, 78; 709/246

(56) References Cited

U.S. PATENT DOCUMENTS

| | | | |
|---|---|---|---|
| 5,513,323 A | * | 4/1996 | Williams et al. ............ 709/246 |
| 5,666,416 A | * | 9/1997 | Micali ......................... 713/158 |
| 5,708,828 A | * | 1/1998 | Coleman ..................... 707/523 |
| 5,991,770 A | * | 11/1999 | Zamora-McKelvy et al. .... 707/200 |
| 6,035,402 A | * | 3/2000 | Vaeth et al. ................. 713/201 |
| 6,119,137 A | * | 9/2000 | Smith et al. ................. 707/523 |

OTHER PUBLICATIONS

Sherree DeCovny, Certificate authorities: To outsource or not?, Bank Technology News; pp. 1–4.*

* cited by examiner

*Primary Examiner*—Gail Hayes
*Assistant Examiner*—Ho S. Song
(74) *Attorney, Agent, or Firm*—Kenyon & Kenyon

(57) ABSTRACT

A local server (202) locally hosts the provision of digital certificate services to a client (102); while a central server (104) provides the actual digital certificate services. The local server (202) transmits (304) a custom entry form (210) to the client (102). In response to the client's (102) use of the custom entry form (210), the client (102) transmits (306) a standard request for digital certificate services to a central server (104), possibly via the local server (202). The central server (104) fulfills (310) the request, generating a standard response. The standard response is transmitted (312) to the local server (202), which generates (314) a custom display of the results contained in the standard response. The custom display is transmitted (316) to the client (102), fulfilling the client's request. Information is provided (320,330), enabling the local server (202) to create (322) appropriate custom entry forms (210) and to generate (314) the custom display from the standard response. The communications between local server (202) and central server (104) preferably are secured.

8 Claims, 9 Drawing Sheets

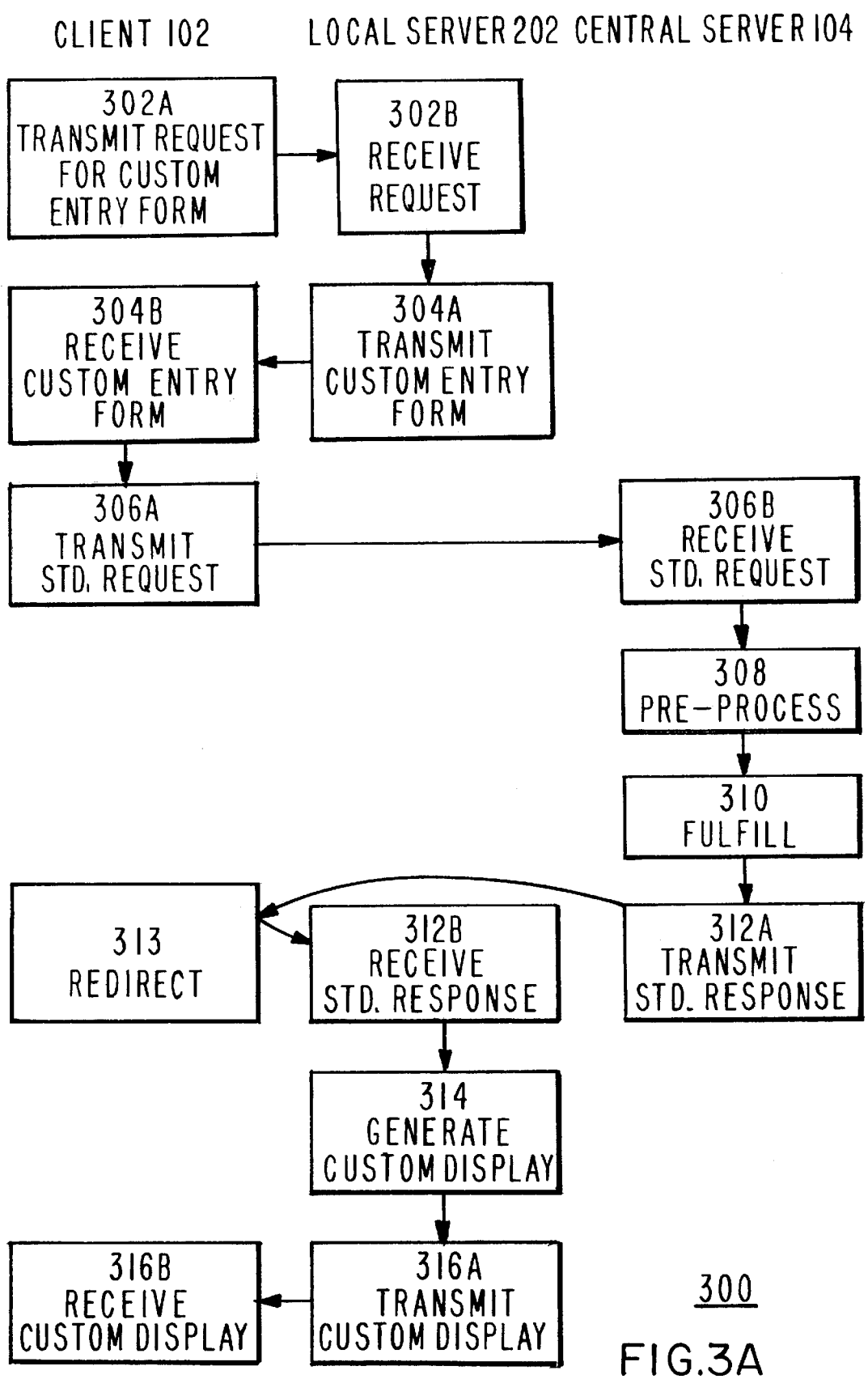

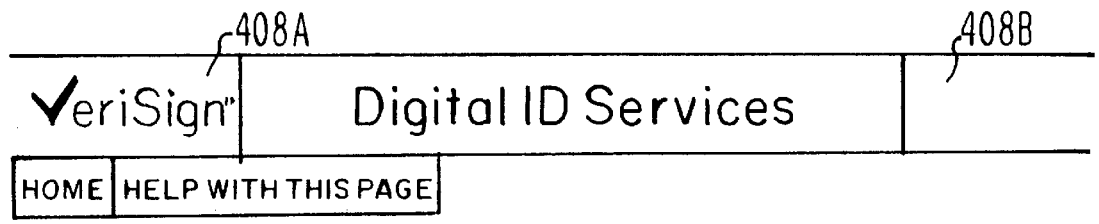

Search For Digital IDs

Search our online database for anyone's Digital ID by entering the name, e-mail address, or serial number and issuer name contained in the Digital ID, and clicking on the SEARCH button. If you cannot locate a Digital ID by e-mail address or name, the owner of the Digital ID may have chosen to "unlist" it when setting Digital ID preferences. In order to find it, you will need to obtain the serial number and issuer name of the Digital ID from its owner.

You cannot use wildcard characters. By clicking the SEARCH button you accept the terms of our Relying Party Agreement.

Search by E-mail Address (recommended)

Enter the E-mail Address
(example: john_doe@verisign.com)

Search for IDs that are:   o Valid   o Expired   o All
                           o Revoked  o Pending

[Search]

Search by Name:

Enter the Exact Name:
The name must be entered exactly as it is in the Digital ID, including punctuation.

Search for IDs that are:   o Valid   o Expired   o All
                           o Revoked  o Pending

[Search]

Search by Digital ID Serial number and Issuer Name:

Select the ID Type:
(issuer name)         [Class 1 CA-Individual Subscriber]

Enter the IDs Serial Number:

[Search]

Copyright © 1998, VeriSign, Inc. All Rights Reserved

FIG. 4

VeriSign® Trust Network

|  VeriSign | Digital ID Sevices | |
|---|---|---|

HELP WITH THIS PAGE

The query returned the following matching certificates. Clicking on the name link will allow you to view more detailed informatiom about the certificate or perform additional operations on the certificate such as download, revoke, renew, replace or set preferences.

🖳 This icon next to a listing indicates that the Digital ID is the owner's preferred certificate for encrypting secure messages.

Mahi df(Pending-not picked up)—504  
mahi@verisign.com———506  
Digital ID ClassI-Client Authentication Standard—508  510⌐ ⎫502A  
Validity period from Mar-16-1998(GMT)to May-15-1998(GMT) ⎭

Mahi de Silva(Expired)  
mahi@verisign.com  
Digital ID ClassI-Client Authentication Standard  ⎫502B  
Validity period from Feb-28-1998(GMT)to Apr-29-1998(GMT) ⎭ ewrwer qewrwer(Valid)  
mahi@verisign.com  
Digital ID ClassI-Client Authentication Standard  
Validity period from Dec-03-1997(GMT)to Jun-04-1998(GMT)     • ewrwersdf qewrwer(Valid)  
mahi@ verisign.com  
Digital ID ClassI-Client Authentication Standard  
Validity period from Dec-03-1997(GMT) to Jun-04 1998(GMT)    • test adsfadsf(Pending-not picked up)  
mahi @ verisign.com  
Digital ID ClassI-Client Authentication Standard  
Validity period from Nov-26-1997(GMT)to Dec-21-1998(GMT)    • asdfsdf23 sdafsdf(Expired)  
mahi @ verisign.com  
Digital ID ClassI-Client Authentication Standard  
Validity period from Sep-29-1997(GMT)to Mar-31-1998(GMT)

sdaf asdfsadf(Expired)  
mahi @verisign.com  
Digital ID ClassI-Client Authentication Standard  
Validity period from Sep-22-1997(GMT) to Mar-24-1998(GMT)

asdfsdf sadfsdf(Expired)  
mahi @ verisign.com  
Digital ID ClassI-Client Authentication Standard  
Validity period from Sep-22-1997(GMT) to Mar-24-1998(GMT)

Mahi InSight Test(Expired)  ⎫  
mahi @ verisign.com  
Digital ID  ClassI-Client Authentication Standard  ⎬502N  
Validity period from Sep-11-1997(GMT)to Mar-13-1998(GMT) ⎭

Next 10

New Search

FIG.5

LOCAL HOSTING OF DIGITAL CERTIFICATE SERVICES

BACKGROUND OF THE INVENTION

1. Technical Field

This invention relates generally to digital certificates issued by a certification authority, digital signatures, and public key cryptography, all of which are part of a security infrastructure for on-line transactions. More particularly, this invention relates to the local hosting of services related to such digital certificates, including, for example, issuing new digital certificates, verifying existing digital certificates, and revoking compromised digital certificates.

2. Background Art

As of the result of the continuous development of new technologies, particularly in the areas of computer networks and communications, the use of large computer networks, such as the Internet, is becoming more widespread. This has resulted in an increase in electronic commerce and other electronic transactions conducted over these networks, with a corresponding need for security for these transactions.

Public key cryptography, as described in Bruce Schneier, *Applied Cryptography* (John Wiley & Sons, Inc., New York, 1996), is one technology addressing this need for security. A PKI (public key infrastructure) is based on assigning key pairs to entities. Each key pair includes a private key and a public key. Either key may be used to encrypt a message; the other key must be used to decrypt the message. The private key is securely held by the entity to which it is assigned; while the public key is widely made available.

The use of these key pairs addresses many of the inherent security problems in an open network such as the Internet. However, without more, two significant problems remain. First, parties must be able to access the public keys in an efficient manner. Second, since communications and transactions are secured by the key pairs and entities are associated with their public keys, there must be a secure method for third parties to verify that a certain public key corresponds to a certain entity.

Digital certificates are one method for addressing both of these problems. A trusted third party, commonly known as a certification authority, issues digital certificates to subscribers. Each digital certificate typically includes the subscriber's public key along with other information about the subscriber. The certification authority "digitally signs" the digital certificate, thereby securing its contents against subsequent tampering. Third parties who wish to verify that a certain public key corresponds to a certain subscriber may do so by examining the corresponding digital certificate.

Digital certificates, therefore, form a significant part of the PKI, and significant resources are required to maintain this infrastructure. For example, new digital certificates are constantly being issued, compromised digital certificates must be revoked, and third parties must be able to efficiently locate and verify another party's digital certificate.

In a prior art approach, these digital certificate services are provided by a central server operated by a certification authority. Clients who desire digital certificate services submit a request to the central server, which processes and fulfills these requests.

One disadvantage of this approach is that the central server alone performs the vast majority of the processing required to fulfill the requests received from clients. In a typical scenario, a certification authority may be responsible for providing digital certificate services to millions of clients, either directly or indirectly through intermediate certification authorities. Even with current processors, the computing resources required to provide this amount of services is significant. This is especially true since digital certificate services are highly confidential by nature and, therefore, significant resources are required to adequately secure the certificate services. In other situations, such as on-line advertising or on-line search engines, the central server bottleneck may be solved in part by establishing mirror sites of the central server. This approach, however, is significantly less attractive for the case of digital certificate services because the security requirements make the establishment of mirror sites significantly more difficult.

Another disadvantage concerns affiliates of the certification authority. In many instances, an entity other than the certification authority would like to appear as the provider of digital certificate services, with the actual provider (i.e., the certification authority) being invisible to the end user. Such entities shall be referred to as affiliates. For example, an affiliate may be a credit card company which issues digital certificates to its card holders, but contracts with the certification authority to actually provide the required digital certificate services. Under the prior art approach, this is difficult to achieve because the affiliate's customers interact directly with the certification authority's central server which, for efficiency reasons, typically provides the same interface to each customer. For example, the central server's interface might include the certification authority's logo but typically would not include the affiliate's logo or other customizations desired by the affiliate. In certain situations, the affiliate's customer may actually be confused because the interface is clearly associated with the certification authority, whereas the customer believes that his digital certificate services are provided by the affiliate.

As a result, there is a need for a capability to enable the local hosting of digital certificate services, for example, on local servers operated by affiliates of a certification authority.

DISCLOSURE OF INVENTION

In accordance with the present invention, a method for having a local server (202) locally host the provision of digital certificate services to a client (102) includes the following steps. Preferably in response to the client's (102) request for digital certificate services, the local server (202) transmits (304) a custom entry form (210) to the client (102). In response to the client's (102) use of the custom entry form (210), the client (102) transmits (306) a standard request for digital certificate services to a central server (104). The central server (104) fulfills (310) the request, generating a standard response. The standard response is transmitted (312) to the local server (202), which generates (314) a custom display of the results contained in the standard response. The custom display is transmitted (316) to the client (102), fulfilling the client's request. Information is provided (320,330), enabling the local server (202) to create (322) appropriate custom entry forms (210) and to generate (314) the custom display from the standard response.

In further accordance with the present invention, a computer readable medium contains such information. The information preferably includes model entry forms (FIG. 4) which query for data included in the standard request. The custom entry forms (210) are based on the model entry forms. The information preferably also includes model templates for displays. The model templates have placeholders for the actual data to be included in the displays. The custom display is based on the model template, and the information may also include a software program (212) to insert the actual data into the placeholders.

In another aspect of the invention, a method for having a local server (202) locally host the provision of digital certificate services to a client (102) includes the following steps. The local server (202) transmits (804) a custom entry form (610) to the client (102). In response to the client's (102) use of the custom entry form (610), the client (102) transmits (806) a custom request for digital certificate services to the local server (202). The local server (202) generates (808) a standard request from the custom request and transmits (810) the standard request to a central server (104), which fulfills (810) the request, generating a standard response. The standard response is transmitted (816) to the local server (202), which generates (818) a custom display of the results contained in the standard response. The custom display is transmitted (820) to the client (102), fulfilling the client's request. Information is provided (320,330), enabling the local server (202) to generate (808) standard requests from custom requests and to generate (818) the custom display from the standard response.

The present invention has many advantages. For example, the local hosting of certificate services allows some of the processing required for digital certificate services to be off-loaded from the central server (104) to local servers (202). This is especially advantageous because the central server (104) typically must have a certain degree of complexity in order to meet the security requirements associated with digital certificate services. The off-loading of functions which do not require this degree of complexity allows the capabilities of the central server (104) to be used more efficiently.

The off-loading of functions to local server (202) also allows a fair amount of customization. For example, the entry forms and displays may be customized by each local server (202). Hence, they are referred to as "custom" entry forms and displays above. In addition, the local hosting may be implemented so that the client (102) appears to interact solely with local server (202), giving the appearance that local server (202) rather than central server (104) is providing the digital certificate services.

BRIEF DESCRIPTION OF THE DRAWINGS

These and other more detailed and specific objects and features of the present invention are more fully disclosed in the following specification, reference being had to the accompanying drawings, in which:

FIGS. 3A–3C are flow diagrams illustrating a method 300 of locally hosting digital certificate services using system 100;

FIG. 4 is an illustration of a model entry form for requesting a digital certificate service;

FIG. 5 is an illustration of a model display of results from a digital certificate service;

DETAILED DESCRIPTION OF THE PREFERRED EMBODIMENTS

Figure 1:
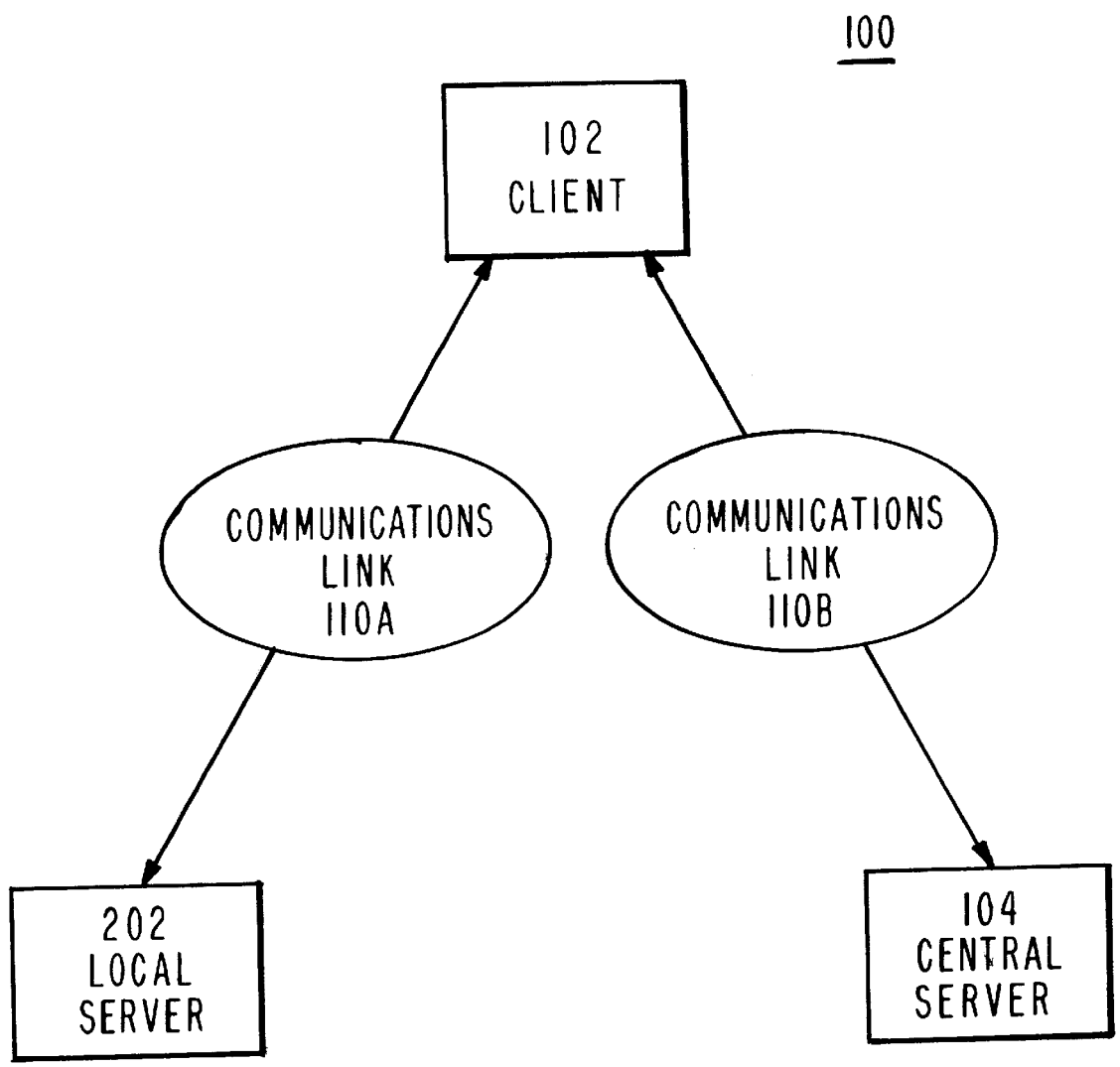
FIG. 1 is a block diagram of a system 100 for locally hosting digital certificate services in accordance with the present invention.

FIG. 1 is a block diagram of a system 100 for locally hosting digital certificate services in accordance with the present invention. The system 100 includes a client 102, a central server 104, and a local server 202. Client 102 and local server 202 are connected by communications network 110A; while client 102 and central server 104 are connected by communications network 110B. In system 100, it is not necessary for local server 202 to communicate directly with central server 104.

In the context of the previously discussed scenario involving a certification authority, the certification authority's affiliate, and the affiliate's customers, central server 104 is operated by the certification authority; local server 202 is operated by the affiliate; and client 102 is operated by the affiliate's customer. The affiliate's customer requests digital certificate services, which ultimately will be fulfilled by central server 104. However, the customer's relationship is with the affiliate, and the customer may not even be aware of the existence of the certification authority or his central server 104. System 100 enables the affiliate to locally host digital certificate services on his local server 202. Thus, it will appear to the affiliate's customer that the affiliate is providing the digital certificate services through his local server 202 when, in fact, the certification authority is providing the services through his central server 104.

As another, related example of a certification authority—affiliate type of relationship, the "affiliate" may be a registration authority working with the certification authority, with the local server 202 operated by the registration authority. Registration authorities are entities which convey transactions, such as digital certificate services, to and from the certification authority. For example, if client 102 is requesting a digital certificate, the registration authority might perform some of the background checking required and forward its findings to the certification authority for further processing and/or issuance of the certificate. In many cases, the certification authority may authorize the registration authority to essentially act as a proxy for the certification authority. Because of the relationship between the registration authority and the certification authority, there typically is a need for these two authorities to communicate with each other in a secure manner. In the proxy scenario, for example, the certification authority may wish to authenticate and/or authorize transactions with the registration authority.

In a preferred embodiment, the digital certificates comply with the ITU-T Recommendation X.509 (1997 E). The digital certificate services offered include the following:

Enrollment—Central server 104 issues a new digital certificate to client 102.

Check status—Central server 104 checks whether a third party's digital certificate is valid.

Retrieval—Central server 104 provides a copy of a third party's digital certificate to client 102.

Search—Central server 104 searches for digital certificates according to some search criteria.

Verification—Central server 104 verifies that a digital certificate is issued by central server 104, is valid (e.g., not expired), and is in good standing (e.g., not revoked).

Revocation—Central server 104 revokes client 102's digital certificate.

Renewal—Central server 104 issues a new digital certificate to client 102, replacing a digital certificate about to expire.

Replacement—Central server 104 issues a new digital certificate to client 102, replacing a digital certificate which has been compromised or otherwise revoked before its expiration date.

Figure 2:
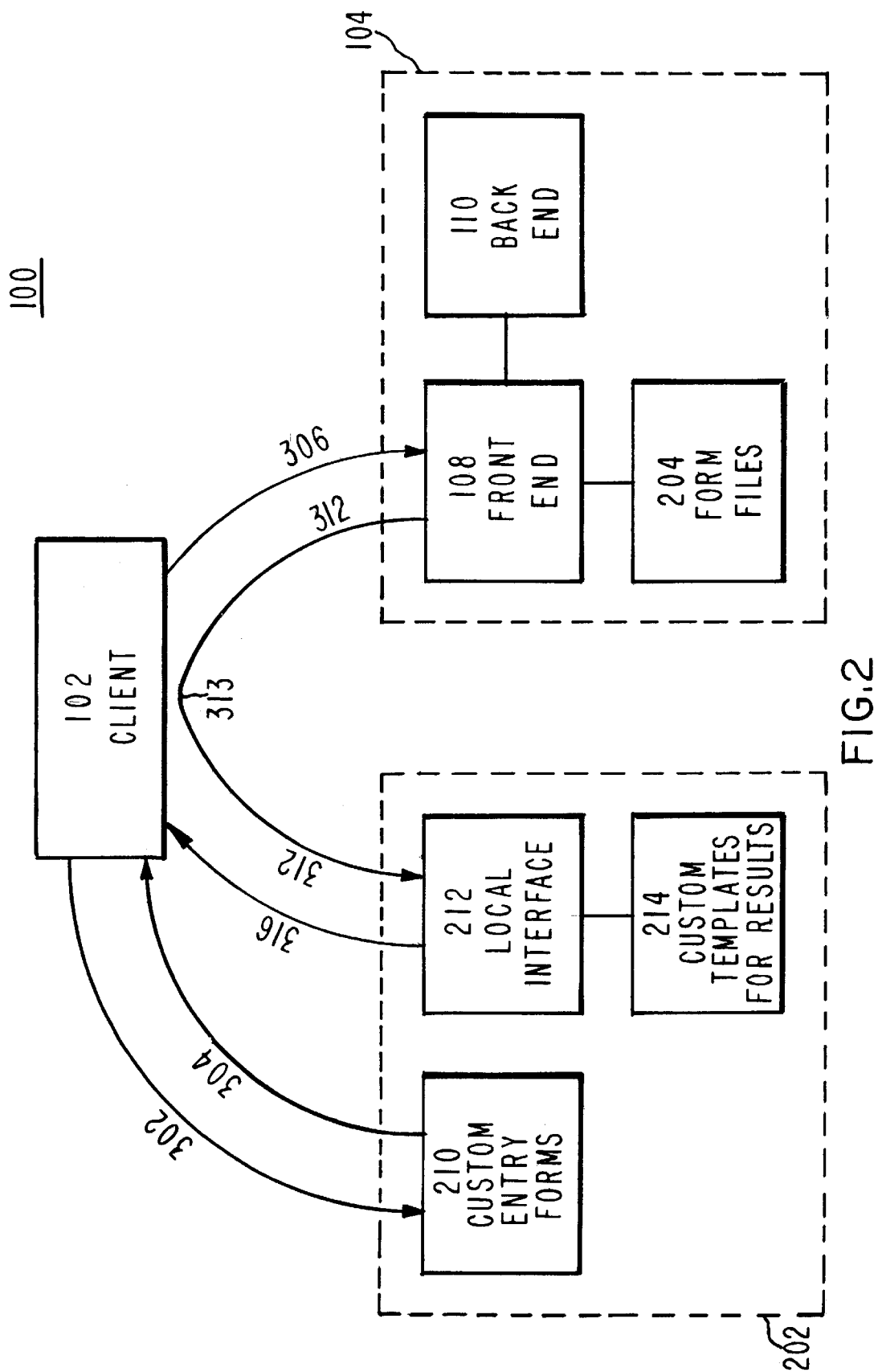
FIG. 2 is a more detailed block diagram of system 100 illustrating a method 300 of locally hosting digital certificate services.

FIG. 2 is a more detailed block diagram of system 100 illustrating a method 300 (see FIG. 3) for locally hosting digital certificate services. Central server 104 includes a front-end 108, a back-end 110, and form files 204. The front-end 108 is coupled to back-end 110, and form files 204 are accessible by front-end 108. Central server 104 is coupled to communications link 110B (not shown) via front-end 108. Local server 202 includes custom entry forms 210, a local interface 212, and custom templates 214 for the display of results of a certificate service. Both the custom entry forms 210 and local interface 212 are accessible from communications link 110A (not shown). In addition, local interface 212 can access custom templates 214. The various numbered arrows 302, 304, etc. will be used in conjunction with FIG. 3 to illustrate a method 300 for using system 100.

On local server 202, custom entry forms 210 are forms which client 102 uses to request digital certificate services. The term "custom" refers to the fact that these entry forms may be customized for each local server 202. Local interface 212 handles the indirect interaction between local server 202 and central server 104, as will be explained in further detail below. Custom templates 214 are templates which are used by local interface 212 to generate custom displays of the results of a requested digital certificate service. In other words, when local server 202 receives the results of a client 102's request for digital certificate services, the local interface 212 uses the custom templates 214 to generate a custom display of these results. Again, the term "custom" refers to the fact that these templates and displays may be customized for each local server 202.

On central server 104, back-end 110 fulfills the various requests for digital certificate services. Front-end 108 acts as an interface between the client 102 and the back-end 110 and form files 204 are used by front-end 108 to pre-process standard requests received by central server 104. Here, the term "standard" refers to the fact that these requests will conform to a standard format understood by central server 104.

Figure 3B:
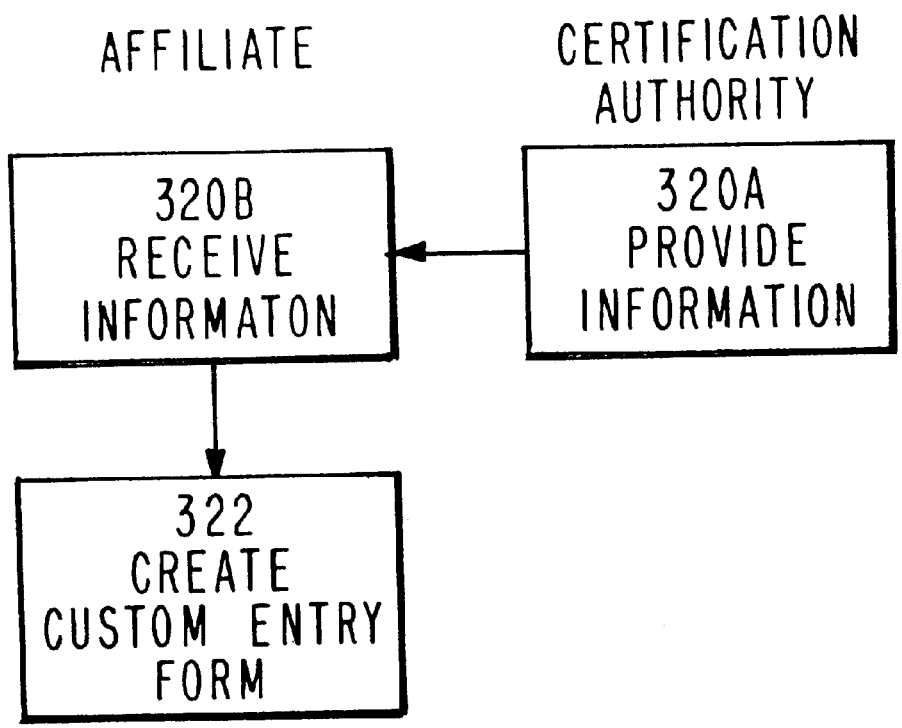
Figure 3C:
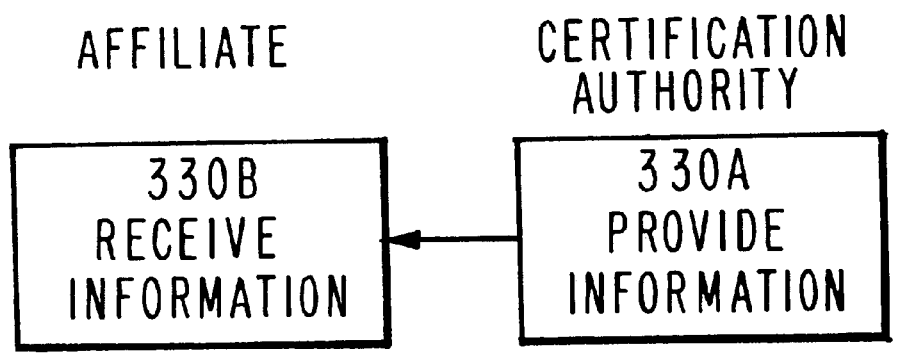

FIGS. 3A–C are flow diagrams illustrating a method 300 of locally hosting digital certificate services using system 100. FIG. 3A illustrates the interaction between client 102, local server 202, and central server 104 during client 102's request for digital certificate services and central server 104's subsequent response. FIGS. 3B and 3C illustrate operations which enable the process of FIG. 3A. These processes typically would occur prior to the process of FIG. 3A.

FIGS. 3A–C use the following format. In FIG. 3A, there are three columns, labeled client 102, local server 202, and central server 104. When a specific step is shown in one of these columns, this indicates that the corresponding entity is executing that step. For example, in FIG. 3A, step 302A of transmitting a request for a custom entry form falls under the column for client 102. This means that client 102 is transmitting the request. Many steps are represented by two blocks because they affect more than one entity. For example, step 302 includes both steps 302A and 302B, because client 102 transmits the request and local server 202 receives the request. For convenience, these two blocks may be described by phrases such as "client 102 transmits 302 a request to local server 202." As another example, in FIG. 3B, steps 320A and 320B of providing and receiving information fall under the columns for the certification authority and affiliate, respectively. This means that the certification authority (which is the entity operating central server 104) provides the information and the affiliate receives it. Certain steps, such as 302, 304, etc., are also shown in FIG. 2.

Referring to FIGS. 2 and 3A, client 102 initiates a transaction by transmitting 302 a request for a custom entry form 210 to local server 202. The custom entry form 210 is a form used to request digital certificate services. In response to the request, local server 202 transmits 304 the custom entry form 210 to client 102. By completing the custom entry form 210, client 102 transmits 306 a standard request for digital certificate services to front-end 108 of central server 104. In a preferred embodiment, because of the nature of the custom entry form 210, the nature of the interaction between client 102 and local server 202, and/or the relationship between the affiliate and its customer, it appears to the customer that the standard request is transmitted to local server 202 rather than to central server 104 and, hence, that the request for digital certificate services will be fulfilled by the affiliate rather than by the certification authority.

In fact, however, front-end 108 of central server 104 preprocesses 308 the standard request, preferably using form files 204. Form files 204 generally assist in the pre-processing by, for example, describing the entry form being used. Back-end 110 then fulfills 310 the pre-processed request, producing a standard response containing the results of the certificate service. Again, the term "standard" refers to the fact that these responses will conform to a standard format understood by central server 104.

Front-end 108 transmits 312 the standard response to local interface 212 of local server 202, via client 102. More specifically, front-end 108 transmits 312A the standard response to client 102 with instructions to redirect 313 the standard response to local interface 212. Local interface 212 receives 312B the standard response and generates 314 a custom display of the results contained in the standard response. In a preferred embodiment, local interface 212 uses custom templates 214 to generate the custom display of the results. Local interface 212 then transmits 316 the custom display of results to the client 102, thus fulfilling client 102's request for certificate services.

In method 300, the local server 202 hosts the provision of digital certificate services to client 102. In particular, local server 202 provides both the custom entry forms 210 for requesting digital certificate services and the custom display of the results from a requested digital certificate service. In a preferred embodiment, client 102 also appears to communicate only with local server 202; central server 104 is transparent to client 102.

FIGS. 3B–C are flow diagrams illustrating processes which typically occur before the process of FIG. 3A in order to enable the local server 202 to host digital certificate services. In FIG. 3B, the certification authority provides information to the affiliate which enables the affiliate to create 322 custom entry forms 210 which generate the standard requests to central server 104. Similarly, in FIG. 3C, central server 104 provides 330 information to the affiliate which enables the affiliate to generate 314 the custom display of results from the standard response provided by central server 104. In both steps 320 and 330, the information may be provided in a number of ways. For example, the information may take the form of software programs, model entry forms, and model displays which are loaded on computer readable media and physically shipped to the affiliate. Alternately, the software programs and models may be made available through the certification authority's web site. As another example, the provided information may take the form of documentation, for example describing the format of the standard request and standard response, rather than actual software programs.

Method 300 will now be described in further detail with respect to a preferred embodiment which shall be referred to as the Internet-based embodiment. In this embodiment, the communications links 110A–B are implemented through the Internet. Client 102 communicates via a browser, such as Netscape's Navigator or Microsoft's Internet Explorer. The central server 104 is operated by a certification authority, such as VeriSign, and local server 202 is operated by the certification authority's affiliate. In the following explanation, the numerals 302, 304, etc. will be used to refer to the steps in FIGS. 2 and 3, although the words accompanying the numerals may be changed to match the terminology of the Internet-based preferred embodiment.

Continuing with the Internet-based embodiment, the custom entry forms 210 are custom HTML documents served by a web server running on local server 202. Client 102 transmits 302 its request by surfing to the appropriate custom HTML document 210. Local server 202 then transmits 304 this custom HTML document 210 back to client 102. Referring to FIG. 3B, in order to create 322 the custom HTML documents 210, certification authority first provides 320 the appropriate information to its affiliate. In this embodiment, the information includes a model entry form (i.e., model HTML documents), which the affiliate may customize to create the custom HTML documents 210 retrieved by client 102.

FIG. 4 is an illustration of a model HTML document provided 320 by the certification authority to its affiliate. This specific model HTML document is used to request that central server 104 search for digital certificates which match certain criteria. The model HTML document includes HTML FORM structures 402A–C to allow searching by e-mail address, exact name, or digital certificate serial number, respectively. Each of these FORM structures 402 follows the general format below:

<FORM METHOD=POST ACTION=front-end 108 >
<INPUT TYPE=HIDDEN NAME=form_file VALUE= form files 204 >
<INPUT TYPE=HIDDEN NAME=remote_host VALUE=local interface 212>
<INPUT TYPE=HIDDEN NAME=next_page VALUE= custom templates 214>
<INPUT NAME=information for request>
[remainder of form]
</FORM>

The ACTION attribute of the FORM structure identifies front-end 108, which is a CGI program or similar program code running on central server 104 in this embodiment, and the METHOD attribute is set to POST. Hence, when the customer fills out the HTML form and submits it by clicking on the Search button 403, the various INPUT elements will be POSTed 306 to front-end 108. However, since the customer typically will not look at the source code for the custom HTML documents 210 and since the customer retrieves the HTML documents 210 from the affiliate's local server 202, customer may have the impression that the information in the INPUT elements is being sent to local server 202 rather than to central server 104. Methods besides the POST method may be used to transmit 306 the standard request. For example, the GET method or CGI scripts may be used to communicate with central server 104.

The INPUT elements include information used in processing the requested digital certificate service, as represented by the element with "NAME=information for request." For example, form 402A includes INPUT elements querying for a specific :email address 404 and for the status 406 of the corresponding digital certificates.

The INPUT elements, particularly HIDDEN INPUT elements, may also include other information. For example, in the above FORM structure, the three HIDDEN INPUT elements convey the following information:

form_file—Identifies the form files 204
remote_host—Identifies local interface 212
next_page—Identifies custom template 214

The affiliate creates 322 its custom HTML documents 210 based on model HTML documents such as the one shown in FIG. 4. Different degrees of customization may be attained, depending on the affiliate's level of effort. If the affiliate does not wish to expend any effort, then he may use the unmodified model HTML documents as his custom HTML documents 210. With minimal effort, the affiliate might change the superficial attributes of the model HTML documents, thus, for example, changing the branding of his custom HTML documents 210. Referring again to FIG. 4, this model HTML document includes pointers for graphics, including for logo areas 408A and 408B. The affiliate may customized the model HTML document to be affiliate-branded by supplying his own logos for areas 408. Alternately, the affiliate may co-brand his custom HTML documents by retaining the certification authority's logo for area 408A but providing his own logo for area 408B.

With more effort, the affiliate may entirely redesign his custom HTML document 210, for example incorporating the affiliate's unique look and feel, provided that the custom HTML document 210 supports the same interface to front-end 108 as the model HTML document. For example, in this specific embodiment, the interface includes pointers to the front-end 108, local interface 212, and form files 204. It also includes the formats for various INPUT elements, such as those used to query for e-mail address 404 and status 406 of the corresponding digital certificates. These interface elements define the format for the standard request received 306 by front-end 108.

Referring again to FIGS. 2 and 3A, after the standard request is POSTed 306 to front-end 108, the central server 104 processes the request. First, front-end 108 pre-processes 308 the standard request. In this embodiment, pre-processing includes steps such as checking that credit card numbers have the correct number of digits, verifying that e-mail addresses have the correct format, etc. Form files 204 define what steps should be taken during the pre-processing phase for each type of request. For example, if the standard request is a request to search by email address, as in form 402A, then the corresponding form file 204, which will be identified by the HIDDEN INPUT form_file, might indicate that the format of the e-mail address should be checked in step 308. Step 308 may also include the execution of certain rules for security purposes. For example, if the standard request contains a timestamp, then step 308 may include checking the timestamp in order to prevent a replay attack. If the pre-processing 308 detects any anomalies, an error message may be sent to client 102.

If the pre-processing 308 is successfully completed, then back-end 110 fulfills 310 the request, generating a standard response which includes information to be included in the final custom display provided to the client 102. In this embodiment, back-end 110 is the certification authority's core transaction processing software, which may include various databases, search engines, etc. In the example of FIG. 4, the standard request instructs the central server 104 to search for digital certificates which match certain criteria, such as a specified email address. The standard response then includes information about the matching digital certificates. For example, it may include a label for the digital certificate, the digital certificate's period of validity, and/or the certification authority which issued the digital certificate.

In the Internet-based embodiment, the standard response is encoded in a flattened dictionary format, which is selected to be canonical, HTTP friendly, and URL-encoded. In other words, the dictionary format is selected to operate in conjunction with the HTTP protocol. Front-end 108 of central server 104 transmits 312 the standard response to the local interface 212, which is a CGI program running on local server 202, via client 102. More specifically, this transmission is achieved by using the HTTP refresh option or the HTTP 1.1 location feature. Front-end 108 uses the GET method to transmit 312A the standard response to client 102, with a request that the client 102 redirect 313 the standard response to local interface 212. Local interface 212 receives 312B the redirected standard response. One advantage of this approach is that it uses only client-server connections (i.e., from central server 104 to client 102, and then from client 102 to local server 202), whereas a direct transmission from central server 104 to local server 202 would require a server-server connection. As a result, this approach can take advantage of the significant infrastructure available for client-server connections, such as the use of the SSL protocol built into browser software in order to secure the transmissions. Taking advantage of built-in infrastructure also reduces any problems with export control restrictions.

After receiving 312B the standard response, local interface 212 of local server 202 generates 314 the a custom display of the results, which is an HTML document in this embodiment. It does this by inserting the information contained in the standard response into the appropriate custom template 214, which are custom variable HTML documents in this embodiment. For convenience, "VHTML" shall be used to variable HTML formats. Referring to FIG. 3C, in order for local interface 212 to generate 316 the custom displays, the certification authority first provides 330 information to the affiliate which the affiliate uses to enable the local server 202 to create custom displays from standard responses. Here, the information includes model templates (i.e., model VHTML documents), which the affiliate may customize to create his custom templates 214. Affiliate may also receive 330 local interface 212 as part of the information received from the certification authority.

FIG. 5 is an illustration of a display of results based on a model template. For convenience, this display will be referred to as a model display. This specific model HTML document displays results from a search for digital certificates associated with a specific email address. That is, these are the results from the digital certificate service requested by the model entry form of FIG. 4.

The model HTML document includes individual entries 502A–N, each of which describes a digital certificate found in the requested search. The entries 502 are displayed in a format which lists digital certificate name 504, email address 506, security class of the digital certificate 508, and period of validity 510.

The VHTML template 214 includes placeholders for information 504–510 and in this specific example may include the following placeholders:

$$digital certificate name$$
$$email address$$
$$security class$$
$$validity period$$

where the $$ are example delimiters used to indicate that the strings within the $$ are variable names rather than literal text. Hence, when local interface 212 receives the standard response containing the information 504–510, it replaces the placeholders in the model VHTML document with the corresponding information, thus producing the model display shown in FIG. 5. The remainder of the VHTML document uses a standard markup language, HTML in this case. The use of VHTML enables the creation of templates that are populated with dynamic data.

As is the case with the entry forms, the affiliate may customize the model templates received from the certification authority to produce his custom templates 214. The custom templates, in turn, will be used by local interface 212 to generate the custom displays transmitted 316 to client 102. As with the entry forms, at one extreme, the affiliate may make no changes to the model templates and use them as is. With some effort, the affiliate may make superficial changes, such as changing logos. With significant effort, the affiliate may design its custom templates 214 from scratch, so long as the templates interface properly with the format of the standard response.

One advantage of method 300 is that some of the processing required to provide digital certificate services are off-loaded to local server 202, thus freeing central server 104 to concentrate on the core processing required to provide digital certificate services. For example, local server 202 may handle the transmission of entry forms, error pages, query help and other pages to client 102. Local server 202 may also handle the formatting of results to be displayed to client 102. The off-loading of these functions is especially advantageous because central server 104 typically must have a certain degree of complexity in order to meet the security requirements associated with digital certificate services. Method 300 off-loads functions which do not require this degree of complexity to local server 202, thus allowing the capabilities of central server 104 to be more efficiently used on tasks which do require the complexity available with central server 104.

The off-loading of functions to local server 202 also allows a fair amount of customization. For example, the affiliate's name, logo, look and feel, or other unique identifiers may be integrated into its custom pages. In fact, the local hosting may be configured so that the client 102 appears to interact solely with local server 202, giving the appearance that local server 202 is providing the digital certificate services. For example, as discussed previously, local server 202 may be operated by a registration authority. Method 300 allows local server 202 to issue and manage digital certificates for its own clients 102 through custom pages, while still retaining the integrity and exploiting the technological advantages that comes with having central server 104 process the digital certificate services. Method 300 also supports co-branding, in which the digital certificate services are associated both with the affiliate and with the certification authority. One advantage of co-branding is that it combines the affiliate's relationship and reputation with its customers with the certification authority's reputation as a certification authority.

Another advantage of method 300 is that all communications take place over client-server links so method 300 can take advantage of the communications capabilities already built into client server software. For example, security for each communications link may be implemented by using the SSL protocol and, preferably, all communications in method 300 are secured by the SSL protocol. This is particularly important in the certification authority—registration authority scenario since communications between the certification authority and registration authority should be secure in order to maintain the integrity of the relationship. Other methods could also be used to secure these communications.

As another example advantage, the local interface 212 is relatively simple since much of the required functionality is already implemented in the corresponding browser and server software. As a final example, method 300 does not rely on binary transport information. So long as local server 202 has HTML capability and can support CGI or similar programming paradigms, it can be used as a local server 202 in method 300.

Figure 6:
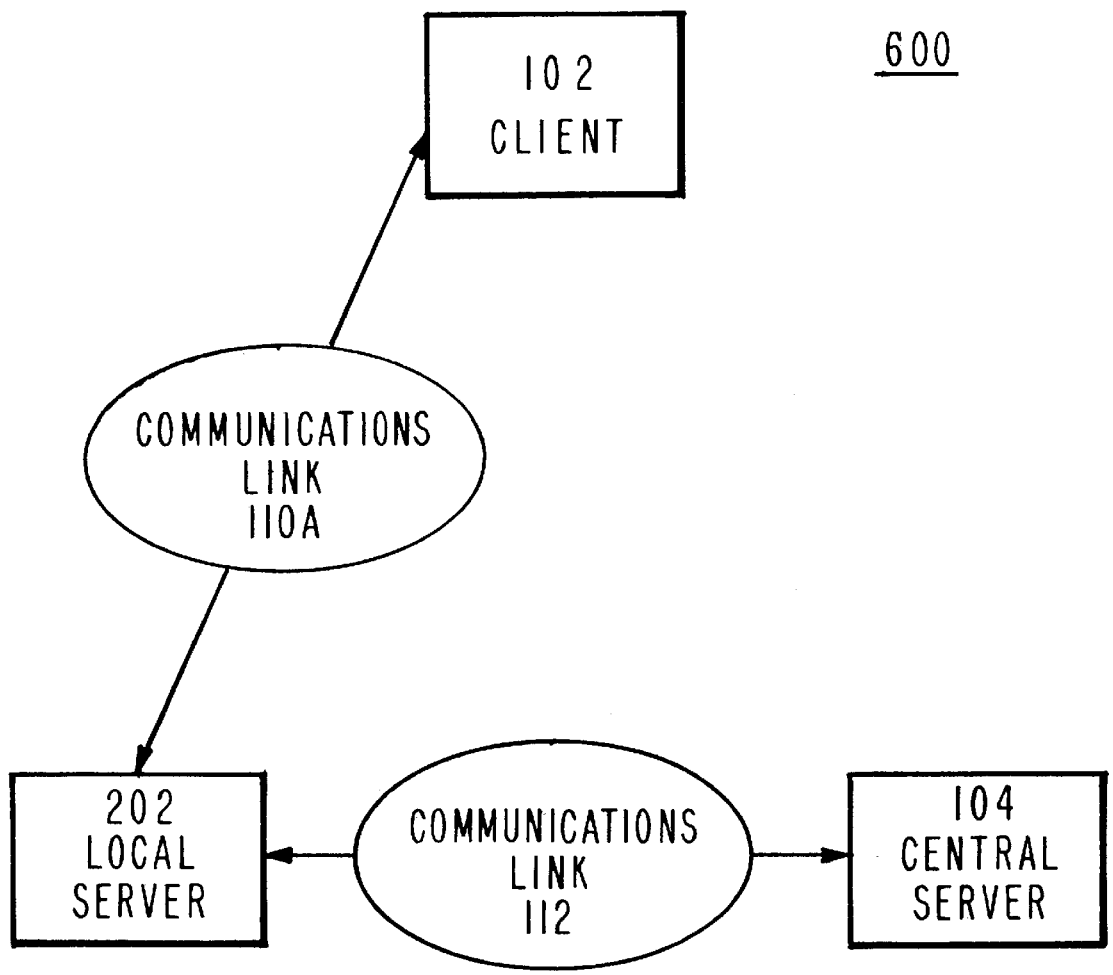
FIG. 6 is a block diagram of another system 600 for locally hosting digital certificate services in accordance with the present invention.

FIG. 6 is a block diagram of another system 600 for locally hosting digital certificate services in accordance with the present invention. As in system 100, system 600 includes a client 102, a central server 104, a local server 202, and a communications link 110A for communication between client 102 and local server 202. However, unlike system 100, system 600 also includes a communications link 112 for communication between local server 202 and central server 104. Note that in system 100, all communications took place over client-server connections whereas system 600 includes a server-server connection.

The architecture of system 600 has some significant advantages. Since the communications link 112 may be a dedicated link between local server 202 and central server 104, there is more flexibility in designing the link 112 and its protocol. For example, the link 112 may use certificate request syntax (CRS) standard protocol as promulgated by the IETF, a custom dictionary format, SSL protocol, ephemeral key-based communications, virtual private networks, or even a physically isolated private communications link. The communications link 112 may be customized to meet the security or other requirements of the Specific situation, including for example the security requirements of the certification authority—registration authority scenario such as the authentication or authorization of transactions from the registration authority (i.e., affiliate).

System 600 also supports the use of obscuring firewalls around local server 202. An obscuring firewall is one which allows local server 202 to communicate only with certain other computers. In system 600, local server 202 communicates directly with central server 104. Hence, a firewall may be installed around local server 202 while still allowing this communications. In contrast, in system 100, local server 202 communicates indirectly with central server 104, via client 102. But there typically will be many different clients 102, making the use of a firewall around local server 202 problematic.

Figure 7:
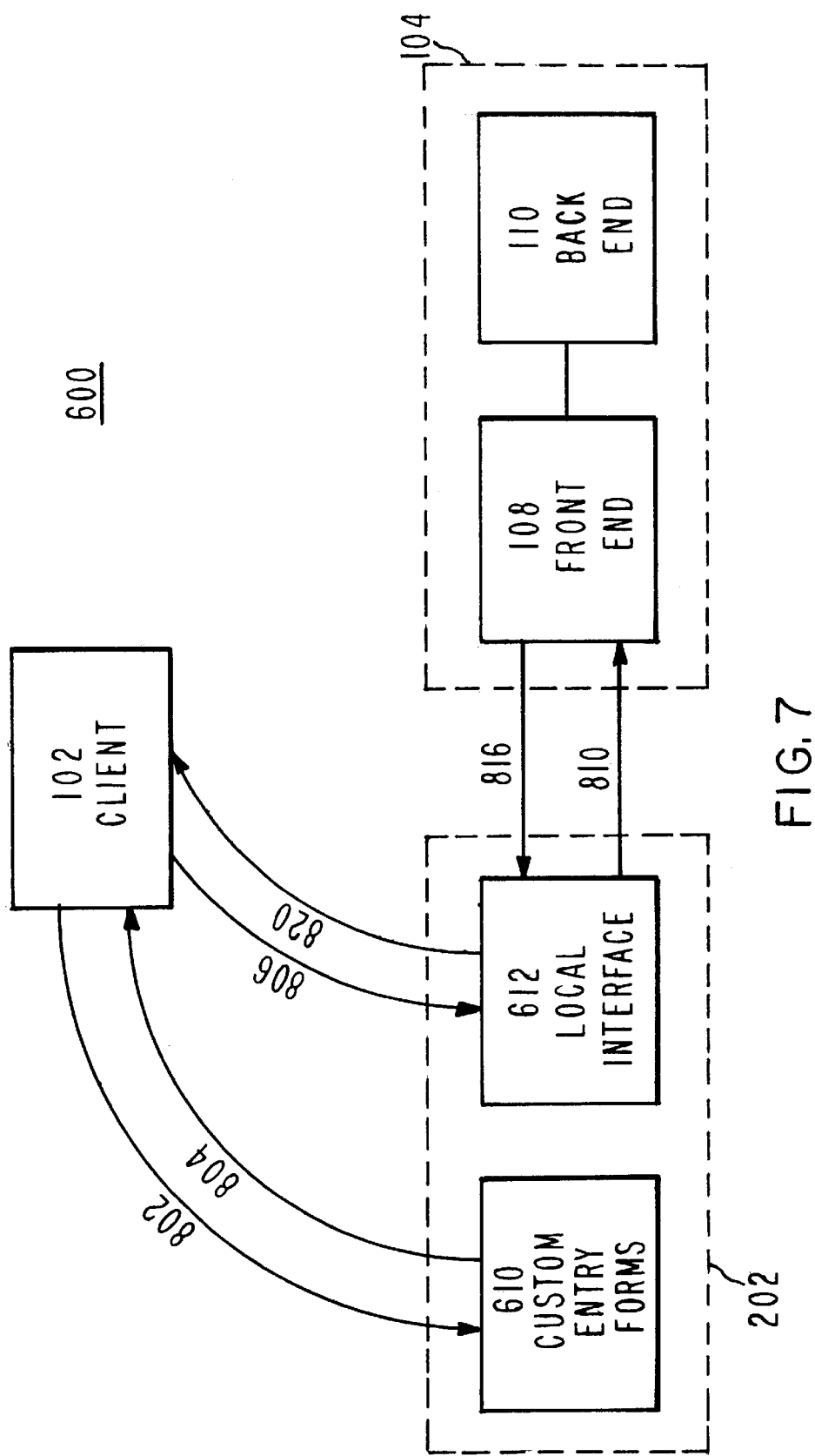
FIG. 7 is a more detailed block diagram of system 600 illustrating a method 800 of locally hosting digital certificate services.

FIG. 7 is a more detailed block diagram of system 600 illustrating a method 800 (see FIG. 8) of locally hosting digital certificate services. In FIG. 7, local server 202 includes custom entry forms 610 and a local interface 612; while central server 104 includes a front-end 108 and a back-end 110. These components generally accomplish the same functions as their counterparts in system 100, although there may be significant differences in their implementations due to the differences in architecture. In particular, the custom entry forms 610 and local interface 612 may be radically different from their counterparts in system 100, as will be apparent from the discussion below.

Figure 8:
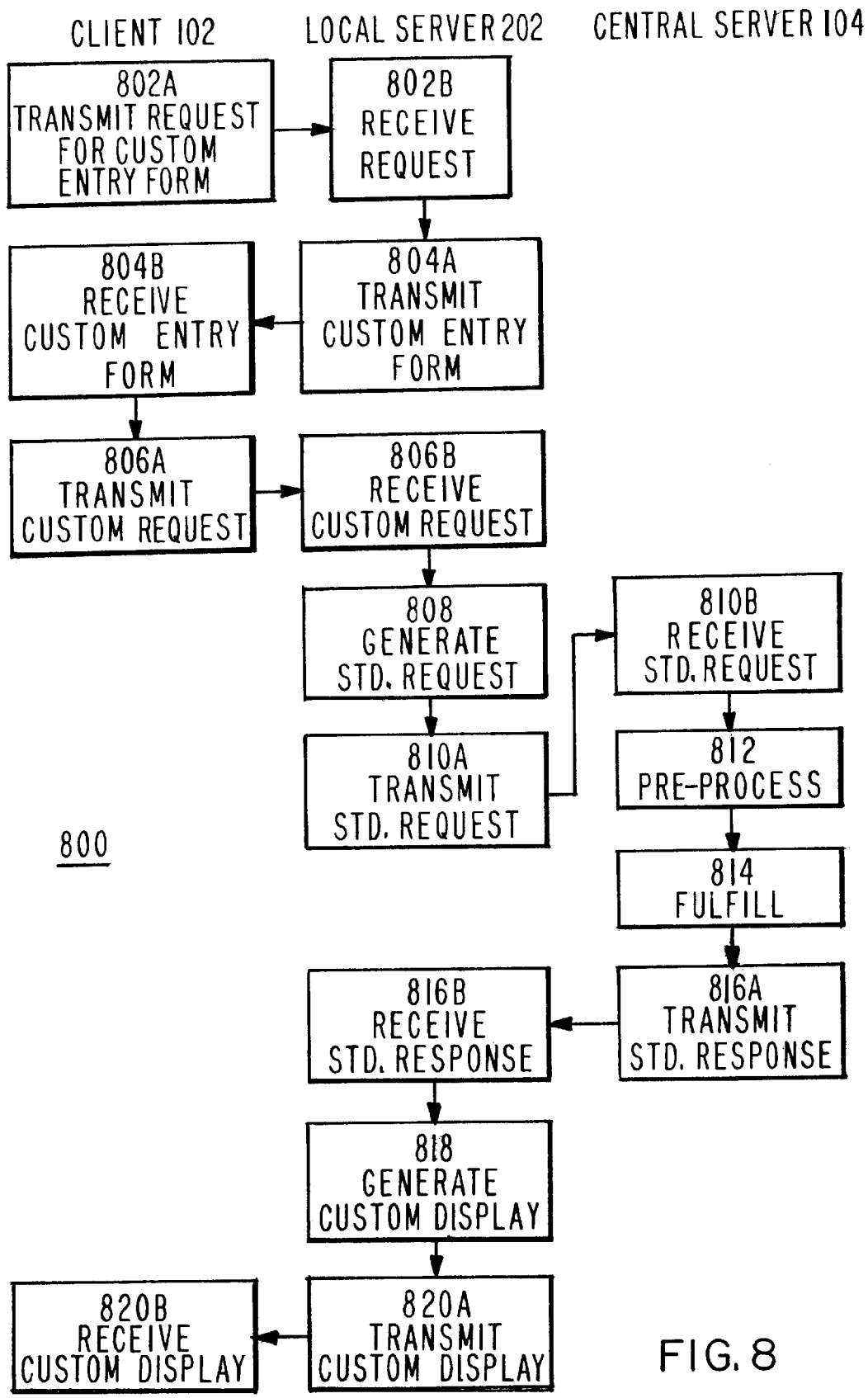
FIG. 8 is a flow diagram illustrating a method 800 of locally hosting digital certificate services using the system 600 of FIG. 6.

FIG. 8 is a flow diagram illustrating a method 800 of locally hosting digital certificate services using the system 600 of FIG. 6. Client 102 transmits 802 a request for a custom entry form to local server 202. Local server 202 transmits 804 the requested custom entry form back to the client 102. Client 102 uses this entry form, thereby transmitting 806 a custom request for digital certificate services to local interface 612. This custom request for digital certificate services may be in any format understandable by local server 202. Hence, it is a "custom" request rather than a "standard" request since it need not be in a standard format used by central server 104. In fact, local interface 612 generates 808 a standard request from the custom request. Local interface 612 transmits 810 the standard request to central server 104. Central server 104 pre-processes 812 and fulfills 814 the standard request. The result is a standard response which is transmitted 816 by central server 104 to local interface 612. Local interface 612 generates 818 a custom display of the results contained in the standard response. The custom display of results is transmitted 820 from local interface 612 to client 102, fulfilling client 102's request for digital certificate services.

In order to support this method, steps similar to those shown in FIGS. 3B and 3C are required in order to enable the local server 202 to convert between the "custom" formats used with client 102 and the "standard" formats used by central server 104. Specifically, the certification authority must provide information which enables local server 202 to generate 808 a standard request from the custom request received from client 102 and to generate 818 a custom display of results from the standard response received from central server 104.

Much of the description regarding the Internet-based preferred embodiment described with respect to system 100 and method 300 is also applicable to system 600 and method 800. For example, in the Internet-based preferred embodiment for system 600 and method 800, the communications link 110A is implemented through the Internet. As discussed above, communications link 112 may or may not be implemented through the Internet. Client 102 communicates via a browser, central server 104 is operated by a certification authority, and local server 202 is operated by the certification authority's affiliate. The custom entry forms 610 are HTML documents, and local interface 612 is a CGI program running on local server 202. Front-end 108 may or may not be a CGI program running on central server 104, depending on the nature of communications link 112; while back-end 110 is the same as in system 100. Due to the sensitive nature of digital certificate services, all communications preferably occur over secure communications links, using the SSL protocol where possible. The information provided by the certification authority to enable the affiliate to set up local server 202 may be computer software and model documents, or may be an interface specification. Other similarities will be apparent and are not repeated here.

In addition to the advantages mentioned previously, method 800 also allows additional control from local server 202, since local interface 612 typically may have significantly more functionality than local interface 212. For example, local interface 612 may perform significant amounts of processing in order to convert between the custom formats and the standard formats or to implement the communications protocol used on communications link 112. As a result, it may be efficient to include additional functions in local interface 612, such as local sorting, filtering, or supplementing of information.

As one example, local server 202 may be a registration authority. Method 800 facilitates registration authority functions since it allows local interface 612 to easily access other information on local server 202 and send this information to central server 104.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. In a system including a certification authority, an affiliate of the certification authority, and a client of the affiliate, a computer readable medium used by the certification authority to enable the affiliate to locally host provision of a digital certificate service requested by the client and provided by the certification authority, the computer readable medium storing:

computer code for generating a standard request to be received by a central server associated with the certification authority, wherein:

a local server associated with the affiliate is coupled to the client, the local server provides to the client a custom entry form containing at least a portion of the computer code for generating the standard request, the client uses the custom entry form to request the digital certificate service, the client's use of the custom entry form results in the standard request for the digital certificate service, the standard request is received by the central server; and a model template upon which a custom display of results is based, wherein:

the model template includes a placeholder for data contained in a standard response, the affiliate creates a custom template based on the model template, the custom template including the placeholder, the central server produces the standard response in response to the standard request, and the local server replaces the placeholder in the custom template with the data in the standard response to produce the custom display.

2. The computer readable medium of claim 1 further storing:

a software program for replacing the placeholder in the custom template with data in the standard response.

3. In a system including a certification authority, an affiliate of the certification authority, and a client of the affiliate, a method for the certification authority to enable the affiliate to locally host generation of a custom display of results to the client for a digital certificate service provided by the certification authority, said method comprising:

the certification authority receiving a standard request for digital certificate services;

the certification authority processing the standard request to generate a standard response;

the certification authority transmitting the standard response to the affiliate; and the certification authority providing information to the affiliate enabling the affiliate to generate the custom display of results based on the standard response, wherein the affiliate is coupled to the client and the affiliate transmits the custom display to the client, wherein:

a local server associated with the affiliate is coupled to the client, the provided information comprises a model template having a placeholder for data contained in the standard response, the affiliate creates a custom template based on the model template, the custom template including the placeholder, a central server associated with the certification authority processes the standard request to generate the standard response, the local server replaces the placeholder in the custom template with data in the standard response to produce the custom display, and the local server transmits the custom display to the client.

4. In a system including a certification authority, an affiliate of the certification authority, and a client of the affiliate, a method for the certification authority to enable the affiliate to locally host generation of a custom display of results to the client for a digital certificate service provided by the certification authority, said method comprising:

the certification authority receiving a standard request for digital certificate services;

the certification authority processing the standard request to generate a standard response;

the certification authority transmitting the standard response to the affiliate; and the certification authority providing information to the affiliate enabling the affiliate to generate the custom display of results based on the standard response, wherein the affiliate is coupled to the client and the affiliate transmits the custom display to the client, wherein:

a local server associated with the affiliate is coupled to the client, a central server associated with the certification authority is coupled to the client, and the step of the certification authority transmitting the standard response to the affiliate comprises the certification authority transmitting the standard response to the client with directions to redirect the standard response to the local server.

5. A system to enable an affiliate of a certification authority to locally host provision of a digital certificate service requested by a client of the affiliate and provided by the certification authority, the system comprising:

a local server associated with the affiliate; and a central server associated with the certification authority; wherein:

the client is coupled to the local server and to the central server;

the local server provides to the client a custom entry form to request the digital certificate service;

the client uses the custom entry form, generating a standard request for the digital certificate service received by the central server;

the central server processes the standard request to generate a standard response;

the central server transmits the standard response to the client with directions to redirect the standard response to the local server;

the local server generates a custom display of results based on the standard response; and the local server transmits the custom display to the client.

6. The system of claim 5 wherein:

the local server comprises:
  a collection of custom entry forms containing the custom entry form provided to the client; and the central server comprises:
  a front-end coupled to receive the standard request for pre-processing the standard request,
  a back-end coupled to the front-end for fulfilling the pre-processed standard request; and
  form files accessible by the front-end for use by the front-end in pre-processing the standard request.

7. The system of claim 5 wherein:

the central server comprises:
  a back-end for fulfilling the standard request, and
  a front-end coupled to the back-end for generating the standard response from the fulfilled standard request; and the local server comprises:
  a local interface coupled to receive the standard response for generating the custom display of results based on the standard response, and
  a collection of custom templates accessible by the local interface for use by the local interface in generating the custom display.

8. The system of claim 5 wherein:

the local server is coupled to the client via the Internet;

the central server is coupled to the client via the Internet;

the client accesses the local server and the central server by a web browser;

the custom entry form includes a first document in a standard markup language and the first document includes a form structure;

the standard request is generated in response to the client using the form structure;

the standard response is encoded in a format which is compatible with the HTTP protocol; and the custom display includes a second document in a standard markup language.

* * * * *